United States Patent [19]

Maglio et al.

[11] Patent Number: 4,908,190

[45] Date of Patent: Mar. 13, 1990

[54] CHEMICAL DISPENSING DEVICE

[75] Inventors: Murrill W. Maglio, West Palm Beach; Stephen D. Moore, Lake Worth, both of Fla.

[73] Assignee: Universal Chemical Feeder, Inc., West Palm Beach, Fla.

[21] Appl. No.: 139,974

[22] Filed: Dec. 31, 1987

[51] Int. Cl.⁴ ........................ B01D 11/02; B01D 12/00

[52] U.S. Cl. .................................... 422/276; 422/282; 422/264; 422/279; 137/268

[58] Field of Search ............................ 137/268, 205.5; 422/264, 266, 276, 278, 279, 280, 281, 2, 255, 113; 222/190, 488; 210/192, 220, 754

[56] References Cited

U.S. PATENT DOCUMENTS

| | | | |
|---|---|---|---|
| 1,085,348 | 1/1914 | Ledoux | 137/205.5 |
| 1,193,038 | 8/1916 | Mann | 137/268 |
| 2,680,715 | 6/1954 | Cook | 137/101.11 |
| 2,989,979 | 6/1961 | Karlson | 137/268 |
| 3,807,434 | 4/1974 | Rasmussen et al. | 138/268 |
| 3,864,090 | 2/1975 | Richards | 23/267 E |
| 4,199,001 | 4/1980 | Kratz | 422/264 |
| 4,407,322 | 10/1983 | Moore et al. | 137/268 |
| 4,548,227 | 10/1985 | Regunathan et al. | 137/268 |
| 4,548,228 | 10/1985 | Moore et al. | 137/268 |

*Primary Examiner*—David L. Lacey
*Assistant Examiner*—Gregory R. Muir
*Attorney, Agent, or Firm*—Finnegan, Henderson, Farabow, Garrett & Dunner

[57] ABSTRACT

A device for dispensing a chemical solution into a pipeline transporting a liquid under pressure irrespective of whether the liquid pressure varies between a maximum and a minimum or is substantially constant. The volume of solution dispensed is varied at times when the liquid pressure is varying by selection of an aperture from a plurality of apertures at varying axial positions, for placing the interior of the pipeline in communication with the interior of the enclosure above the solution level, at times when the level drops axially to the selected aperture; or, at time when the liquid pressure is substantially constant, by adjustment of the amount of liquid permitted to enter the device.

7 Claims, 2 Drawing Sheets

CHEMICAL DISPENSING DEVICE

BACKGROUND OF THE INVENTION

The present invention relates to a chemical feeder, and, more particularly to a chemical feeder which is useful for the controlled dispensing of a chemical into a pipeline transporting a liquid.

Chemical treatment of potable water, including removal of undesirable sulphur ordors, is often necessary. To accomplish this treatment, various devices in the art seek to feed controlled amounts of a water-soluble chemical into a water line or pipeline wherein the pressure is subject to variation. Such a device is our invention described in U.S. Pat. No. 4,548,228, issued Oct. 22, 1985, for a chemical feeder which is satisfactory for applications where water is pumped from a well into a pressure tank wherein the pressure varies between a maximum and a minimum (typically, between 20 to 40 pounds per square inch). In the typical situation, the pump starts at the minimum pressure and stops at the maximum pressure. This pressure variation is used in our above mentioned invention to create a reservoir of compressed air in a pressure tight container, which expands to force the chemical solution into a water line whenever the pressure in the line is less than the pressure in the container.

In providing a chemical feeder for the dispensing of a chemical solution into a pipeline, it is important to provide for easy addition of the chemical to be dispensed, and to provide simple means for preselecting the amount of chemical to be dispensed. It is also desirable to provide a chemical feeder for the dispensing of the chemical solution from a container in applications wherein the pressure in the pipeline is substantially constant, such as in sprinkler systems, irrigation systems and swimming pools, and the chemical solution is forced from the container into the water. It is further desirable to provide a chemical feeder with the capability to dispense chemical in response to either variable pressure or constant pressure in the pipeline.

SUMMARY OF THE INVENTION

An object of the invention is to provide a simple, reliable and inexpensive device for the controlled dispensing of preselected amounts of a chemical solution into a pipeline transporting liquid under pressure.

Another object is to provide a device for dispensing a chemical solution irrespective of whether the liquid pressure in the pipeline is either varying or is substantially constant.

Another object is to provide a device for dispensing a chemical solution that can be easily adjusted to dispense the chemical solution in varied amounts.

Another object is to provide for easy installation of the device and easy addition of chemical to be dispensed.

To achieve the foregoing objects, and in accordance with the invention as embodied and broadly described herein, a device for dispensing chemical solution into a pipeline transporting a liquid under pressure is provided, comprising a pressure tight enclosure for containing air and a chemical solution to be dispensed. The enclosure has a top portion with a removable cover for sealing the enclosure and for permitting the addition of the chemical into the enclosure and a bottom portion for fluid tight coupling with the pipeline. The bottom portion includes a pipe coupling means having a restricted portion formed therein for creating a pressure differential between the pipeline liquid at upstream and downstream ends thereof in the direction of liquid flow. An elongated first tube means disposed in the enclosure and in fluid communication with a point adjacent the restricted portion is operative for dispensing a selected volume of the chemical solution and refilling the enclosure with liquid to a predetermined level at times when the liquid pressure varies between a minimum and a maximum. A second tube means is disposed in the enclosure and in fluid communication with a point upstream of the restricted portion in the direction of flow in the pipeline. The first tube means is operative in combination with the second tube means for continuously dispensing a selected volume of the solution during refilling of the enclosure with a substantially equivalent volume of liquid by the second tube means at times when the liquid pressure in the pipeline is substantially constant. Means, including the first and second tube means, are provided for selecting the volume of solution to be dispensed and for selectively operating the second tube means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

The accompanying drawings which are incorporated in and constitute a part of the specification, illustrate a preferred embodiment of the invention and, together with the summary description given above and the detailed description of the preferred embodiment including the appended claims given below, serve to explain the principles of the invention.

DESCRIPTION OF THE PREFERRED EMBODIMENT

Figure 1:
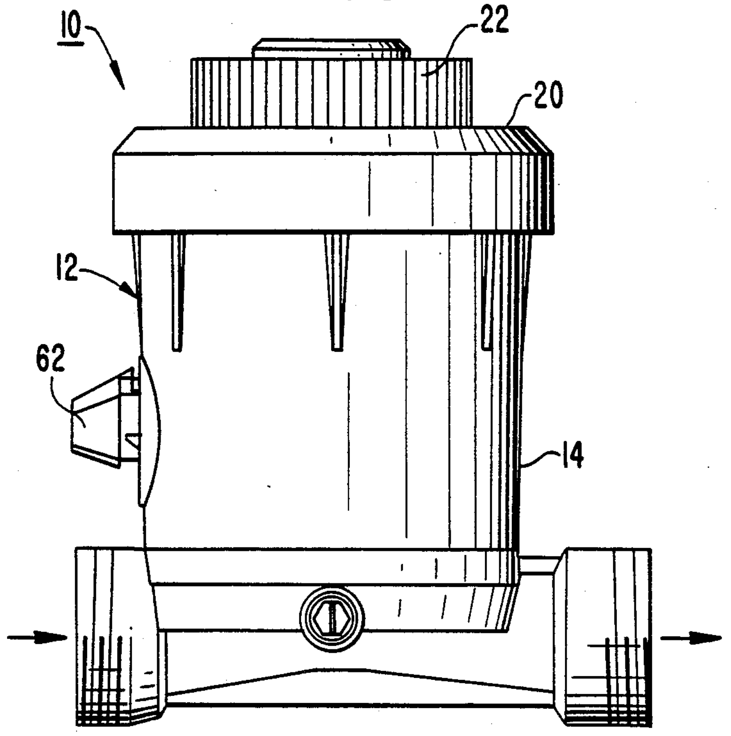
FIG. 1 is an elevation view of a device for dispensing a chemical solution into a pipeline transporting a liquid incorporating the teachings of the present invention.

Reference will now be made in detail to the present preferred embodiment of the invention, an example of which is illustrated in the accompanying drawings wherein like reference numerals refer to like parts.

Figure 2:
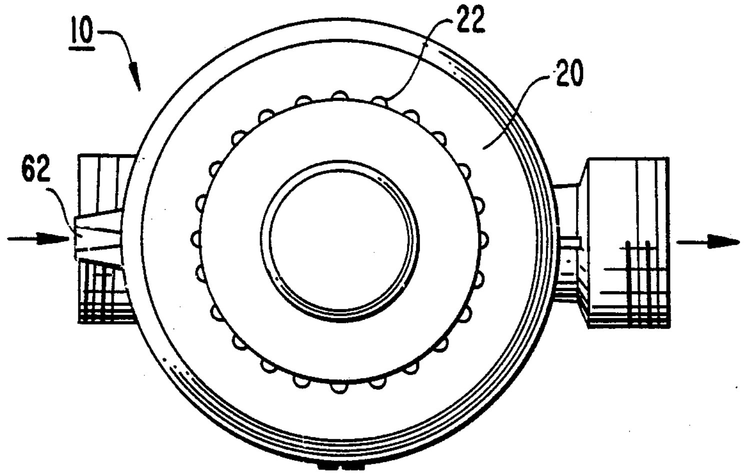
FIG. 2 is a top view of the device illustrated in FIG. 1.
Figure 3:
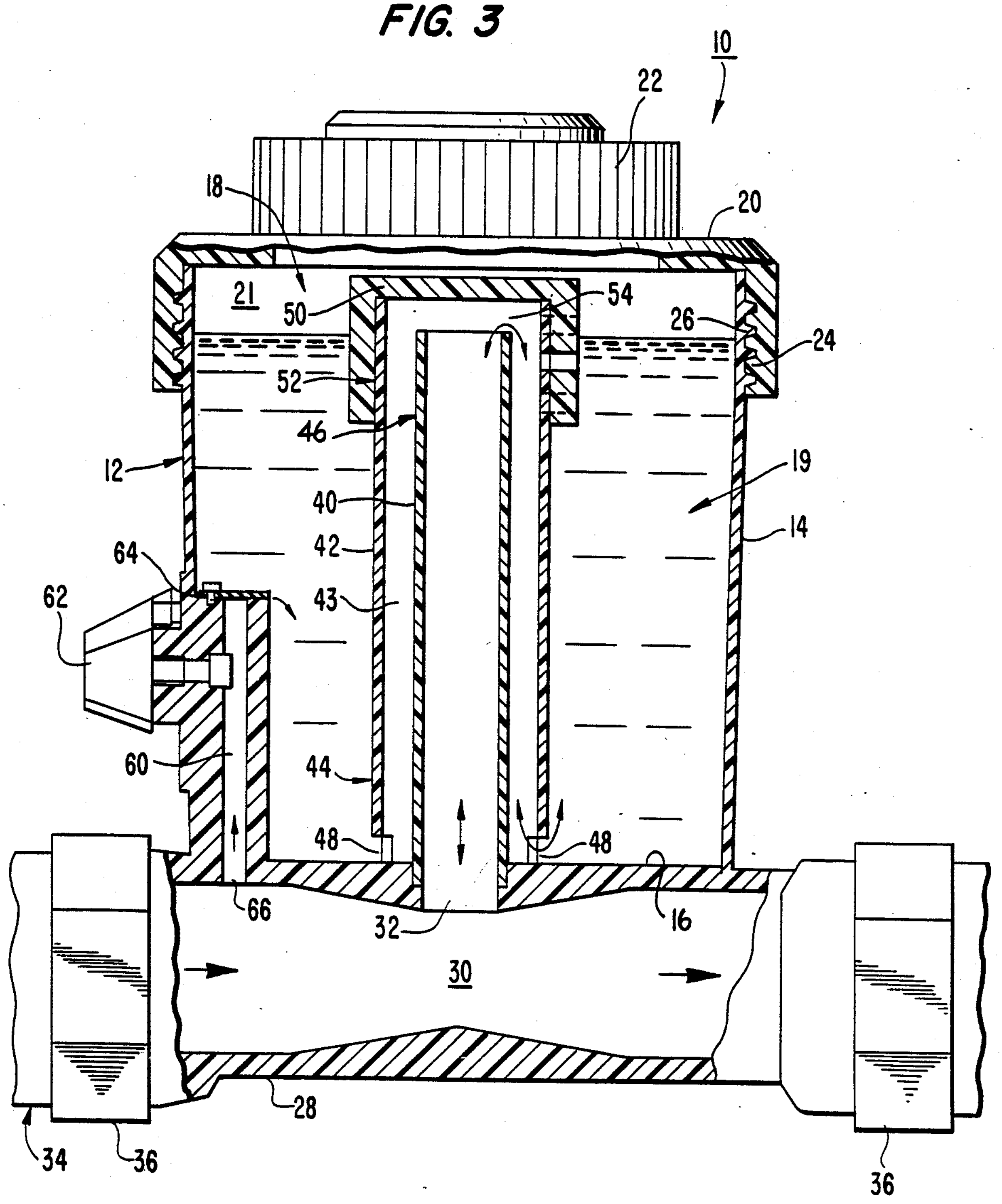
FIG. 3 is a sectional view of the device illustrated in FIG. 1.

A device for dispensing a chemical solution into a pipeline transporting a liquid under pressure is shown in FIGS. 1-3 and generally represented by the numeral 10. Device 10 includes a pressure tight enclosure 12 for containing air and a chemical solution to be dispensed. Enclosure 12 has a top opening with a removable cover for sealing the enclosure and for permitting the addition of the chemical into the enclosure, and a bottom portion for fluid tight coupling with the pipeline. The bottom portion includes a pipe means having a restricted portion formed therein for creating a pressure differential between the pipeline liquid at upstream and downstream ends thereof in the direction of flow.

As embodied herein, as shown in FIGS. 1 and 2, the shape of enclosure 12 is substantially that of a circular cylinder having walls 14, bottom surface 16 and a top opening 18 with a removable cover 20. Chemicals such as chlorine in the form of calcium hypochlorite chlorine tablets and phosphate powders, may easily be added to enclosure 12 after removing cover 20. When the cover 20 is replaced, and enclosure 12 is in fluid communication with a pipeline, enclosure 12 contains a solution 19 comprised of chemical dissolved in the liquid. The concentration of the chemical solution 19 varies in enclosure 12, and is typically higher in the lower regions of enclosure 12 near bottom surface 16, since chemical solutions are typically heavier than water. Removable cover 20 has a gripping portion 22 to facilitate removal manually and interior threads 24 for engaging threads 26 protruding from enclosure 12 adjacent top opening 18 surrounded by the upper edge of walls 14. A gasket means (not shown) may be provided for sealing cover 20 to enclosure 12. When cover 20 is in place and device 10 is in fluid communication with pipeline 34 with the flow direction shown by the arrow, air 21 displaced by the solution 19 accumulates above the level of the solution 19 in the space below cover 20 and is compressed to a pressure corresponding to the pressure of the liquid in pipeline 34.

A pipe coupling (conduit) 28 having a venturi shape is molded integral with the enclosure 12, below bottom surface 16. The interior of pipe coupling 28 is convergent upstream and divergent downstream with a restricted region 30 central thereto and is in fluid communication with the enclosure 12 at first opening 32 formed in surface 16. The ends of pipe coupling (conduit) 28 may be easily coupled to pipeline 34 by union adapters 36. The venturi effect causes a reduction in pressure of the liquid as it flows past restriction 30.

The invention includes a first tube means disposed in the enclosure and in fluid communication with a point adjacent the restricted portion and operative for dispensing a selected volume of the solution and refilling the enclosure with liquid to a predetermined level at times when the liquid pressure in the pipeline varies between a minimum and a maximum.

Figure 4:
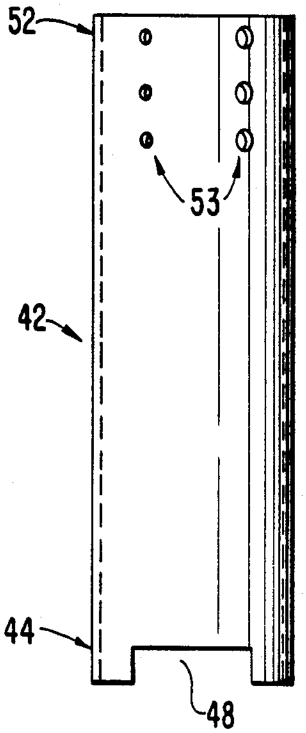
FIG. 4 is an elevation view of the outside tube as illustrated in FIG. 3, showing the apertures therein.
Figure 5:
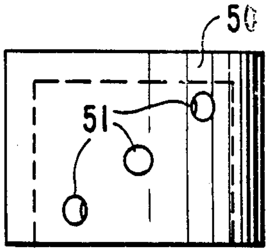
FIG. 5 is an elevation view of the cap as illustrated in FIG. 3, showing the apertures therein.

In accordance with the invention, there is provided elongated tube means. As embodied herein, and referring to FIGS. 3, 4 and 5, elongated tube means includes inner tube 40 having a small diameter and outer tube 42 having a larger diameter. Inner tube 40 and outer tube 42 are concentric and joined in the center of the enclosure 12 to form annular region 43 extending from the lower end 44 of outer tube 42 to the upper end 46 of inner tube 40. Outer tube 42 operates in the manner of a baffle tube to promote mixing of the chemical added to solution 19 by increasing the length of the path taken by solution 19 when dispensed from the interior of enclosure 12 into pipeline 34. Annular space 48 is provided between lower end 44 of outer tube 42 and bottom surface 16. The location of space 48 near bottom surface 16 also promotes mixing of the liquid introduced into enclosure 12 during refilling with solution 19, since the chemical concentration is generally higher near bottom surface 16. Inner tube 40 penetrates bottom surface 16 at circular first opening 32 and extends to connect with pipe coupling (conduit) 28 at the restriction 30. A cylindrical cap 50 encloses the upper end 52 of outer tube 42 and separates air 21 from the region interior to tubes 40 and 42. Cap 50 completes a liquid path between bottom surface 16, annular region 43, the interior of inner tube 40 and the interior of pipe coupling 28 adjacent to and downstream of restriction 30. Annular gap 54 is provided between cap 50 and the upper end 46 of inner tube 40. Cap 50 has a plurality of radially and axially spaced holes 51, any one of which may be selected for alignment with one of the holes selected from hole pairs 53 radially and axially spaced from each other in the upper end 52 of outer tube 42 adjacent cap 50. A mesh screen (not shown) may be provided adjacent annular space 48 or annular gap 54 to retain sediment or particulate in enclosure 12.

A second tube means is disposed in the enclosure and in fluid communication with a point upstream of the direction of flow. The first tube means is operative in combination with the second tube means for continuously dispensing a selected volume of the solution during refilling of the enclosure with a substantially equivalent volume of liquid by the second tube means at times when the liquid pressure in the pipeline is substantially constant. Means, including the first and second tube means, are provided for selecting the volume of solution to be dispensed and for selectively operating the second tube means.

As embodied herein, the second tube means comprises tubular passage 60 formed in the peripheral wall of the enclosure 12 and penetrates bottom surface 16 at second opening 66 located upstream of first opening 32 in the direction of flow in pipeline 34. Passage 60 extends to a position axially intermediate lower end 44 of outer tube 42 and upper end 46 of inner tube 40. Adjustable orifice 62 includes a valve operated from the exterior of enclosure 12 to adjust the flow of fluid entering passage 60 from the pipeline 34 at a point adjacent second opening 66. Hinged flapper valve 64 is attached adjacent wall 14 covering the top opening of passage 60 to prevent backflow of mixture 19 through passage 60 at times when solution 19 is dispensing into pipeline 34 from inner tube 40.

The device 10 may be operated selectively in two modes, depending upon whether the pressure of the liquid in pipeline 34 varies between a maximum and a minimum (varying pressure mode), such as in the application where water is pumped from a well to a pressure tank, or is substantially constant (constant pressure mode), such as in the application of a sprinkler or an irrigation system.

In the varying pressure mode of operation, device 10 may be operated with valve orifice 62 closed to prohibit the introduction of liquid from the pipeline 34 into the interior of enclosure 12 via passage 60. Cap 50 is rotated in position such that one of holes 51 is aligned with one of the holes in one of the hole pairs 53 (FIGS. 4 and 5) In response to increasing liquid pressure in pipeline 34, i.e., during filling of enclosure 34, liquid flows through first opening 32 adjacent restriction 30 and travels up the tube 40, past gap 54, down annular region 43, past gap 48 and mixes with solution 19 interior to enclosure 12, until such time as the pressure of compressed air 21 equals the pressure in pipeline 34 and device 10 is in a filled condition.

In this filled condition, the level of solution 19 corresponds to the interior volume of enclosure 12 and the maximum fluid pressure in pipeline 34, at a point axially above the uppermost one of holes 51 in cap 50. The level remains fixed until the liquid is next used from the pipeline 34. As liquid is used, the pressure in the pipeline 34 is lowered, and solution 19 is dispensed from enclosure 12 into pipeline 34 by the action of forces resulting from the expansion of air 21 which was compressed when enclosure 12 was last refilled with liquid. The flow path taken by the dispensing solution 19 is the reverse of the path taken by the liquid in refilling the enclosure. Valve 64 covering the top opening of passage 60 prevents backflow of dispensing solution 19 via passage 60 when device 10 is operated in the varying pressure mode.

When device 10 is operated in the varying pressure mode the volume of solution 19 dispensed corresponds to the decrease in level of solution 19 from an initial point above the uppermost of holes 51, to a minimum level corresponding to the axial position of the hole selected from hole pairs 53 in outer tube 42 when cap 50 was last rotated into position to align a hole selected from holes 51 with the selected hole from pairs 53. During dispensing, solution 19 decreases to that axial level, at which point compressed air 21 escapes through the selected hole into the interior of outer tube 42 and inner tube 40 so that no more solution 19 will be dispensed. Due to the chemical concentration gradient in enclosure 12, by selecting a lower and smaller one of the holes from pairs 53 a larger amount of chemical will be dispensed into pipeline 34 until the level of solution 19 reaches the hole, compared to selecting a relatively higher and larger one of the holes from hole pairs 53.

It is to be further pointed out that during dispensing, solution 19 with higher chemical concentration entering annulus 43 via space 48 is mixed (or diluted) with solution 19 having lower chemical concentration, entering annulus 43 via the selected hole in tube 42. Accordingly, the selection of a smaller one of the holes from one of hole pairs 53 will result in the dispensing of more chemical into pipeline 34 as the minimum level is reached, compared to selection of the larger hole from that pair.

It will be seen that the height to which inside tube 40 extends above bottom surface 16, and the outside diameter of cap 50, are controlling factors for minimum dispensing of chemical from device 10.

According to an actual reduction to practice, for an enclosure having an interior volume of about 145 cubic inches the holes 51 formed in cap 50 have a diameter of $\frac{1}{4}$ in., the large and small holes 53 formed in the outer tube 42 have diameters of between 3/16 in. and $\frac{1}{8}$ in., respectively, the height of inner tube 40 above bottom surface 16 is about 6.0 in., and the outer diameter of cap 50 is about 2.2 in. It has been found that if the large diameter holes 53 are in excess of 3/16 in. in diameter, insufficient amounts of chemical are dispensed since a large portion of the solution dispensed will come from near the cap 50 where the chemical concentration is less.

The maximum amount of chemical dispensing will occur when cap 50 is rotated so that none of the holes from hole pairs 53 is aligned with any of holes 51, in which case the expanding air 21 can continue to force solution 19 into annular region 43, past gap 54, and down inside tube 40 until the level of solution 19 reaches space 48, or until the pressure in enclosure 12 equilibrates with the pressure in pipeline 34. In any event, no mixture will be dispensed from enclosure 12 when the pressure of air 21 equals the pressure in pipeline 34.

In operating device 10 in the constant pressure mode, cap 50 is rotated into position so that none of the holes from hole pairs 53 is aligned with any of the holes 51, and valve orifice 62 is opened as desired to permit the introduction of liquid from pipeline 34 past valve 64 and into the interior of enclosure 12 via passage 60. The venturi action of restriction 30 in pipe coupling 28 causes reduced pressure at points adjacent restriction 30 compared to points upstream in the direction of flow. A suction effect draws solution 19 into the restriction 30 via first opening 32. As a result, solution 19 is dispensed into pipeline 34 in amounts equivalent to the liquid introduced into enclosure 12 via passage 60. Valve 64, which may be any suitable type of check valve or flapper valve, opens to permit introduction of liquid and may be closed to prohibit backflow via passage 60 during the varying pressure mode.

A third mode of operation is also possible in situations where it is desirable that device 10 dispense chemical in response to either varying pressure or substantially constant pressure in pipeline 34. An example of such a situation is where a pump used to pump water from a well into a pressure tank, which under ordinary circumstances would vary the pressure between a minimum and a maximum, is unable to build up pressure in the tank to the maximum set point which would cause the pump to shut off. The device 10 will discontinue operation in the varying pressure mode, and will begin automatically to operate in the constant pressure mode with liquid pressure in pipeline 34 corresponding to the pressure which the pump can maintain. This combined or simultaneous mode of operation may be achieved by operating device 10 as in the varying pressure mode, except that valve orifice 62 is not closed but is adjusted in conjunction with the selection of one of the holes 53 to control the amount of solution 19 to be dispensed.

While reloading the chemical in device 10, the flow in pipeline 34 must be shut off at the source, and a bottom drain opened to drain and clean out enclosure 12. Cover 20 is removed, chemical is added to enclosure 12 and cover 20 is replaced. After closing the drain, the flow in pipeline 34 may be reestablished. If cover 20 is removed when operating device 10 in the varying pressure mode, after refilling of enclosure 12 and compression of air 21 in the space above the level of solution 19, it will be necessary to shut off the flow in pipeline 34 at the source, drain the solution 19 from enclosure 20 until the level is reduced to axially below cap 50, replace cover 20 and reestablish flow in order to resume operation. Preferably, when using device 10 to dispense chlorine in the form of calcium hypochlorite tablets, 10 gram tablets should be used. It has been found that use of smaller tablets, such as 1 gram tablets, may result in impaired operation as the tablets will tend to fuse into a solid mass.

Device 10 is preferably constructed of corrosion-proof material, such as glass-filled polypropalene.

It will be apparent to those skilled in the art that various modifications and variations can be made in the embodiments of the present invention without departing from the scope or spirit of the invention. Thus, it is intended that the present invention cover the modifications and variations of this invention provided they come within the scope of the appended claims and their equivalents.

What we claim is:

1. A device for dispensing chemical into a pipeline transporting liquid under pressure, the device operating in a first mode when the pressure in the pipeline is variable, and operating in a second mode when the pressure in the pipeline is substantially constant, the device comprising:

a conduit adapted to be disposed in-line with the pipeline, said conduit defining a liquid flow path and having an upstream end, a downstream end, a first conduit opening disposed between said upstream and downstream ends, and a second conduit opening disposed between said first conduit opening and said upstream end, said conduit also including venturi effect means for causing the fluid pressure proximate said first conduit opening to be lower than the fluid pressure proximate said second conduit opening;

an enclosure having a bottom end and a top end, the enclosure having a first enclosure opening disposed on said bottom end and a second enclosure opening;

means for connecting said first enclosure opening to said first conduit opening for liquid communication between said enclosure and said conduit;

means for connecting said second enclosure opening to said second conduit opening for liquid flow from said conduit to said enclosure;

means for introducing chemical into said enclosure;

first valve means for restricting fluid flow from said enclosure to said conduit through said second enclosure opening, said first valve means allowing fluid flow from said conduit to said enclosure through said second enclosure opening; and elongated tube means extending from said first enclosure opening toward said top end of said enclosure, said elongated tube means directing at least a portion of the liquid exiting said enclosure from said bottom end towards said top end to mix chemical in said enclosure with said liquid exiting from said enclosure through said first enclosure opening, wherein in said first mode of operation, said liquid enters and exits said enclosure through said first enclosure opening in response to differences in pressure between said conduit and said enclosure, and wherein in said second mode of operation, said liquid enters said enclosure through said second enclosure opening and exits said enclosure through said first enclosure opening in response to the venturi effect of said venturi effect means.

2. A device according to claim 1, wherein said venturi effect means includes a restriction in said conduit proximate said first conduit opening for narrowing the cross-sectional area of the liquid flow path, the cross-sectional area of the liquid flow path proximate the first conduit opening being smaller than the cross-sectional area proximate the second conduit opening.

3. A device according to claim 1, wherein said conduit and said enclosure are integrally formed and include a shared wall, and said means for connecting said first enclosure opening to said first conduit opening and said means for connecting second enclosure opening to said second conduit opening includes two openings in said shared wall.

4. A device according to claim 1, wherein said top end of said enclosure includes a top end opening and said means for introducing chemical into said enclosure includes a removable cover disposed on said top end opening, said cover forming a substantially air-tight seal with said enclosure.

5. A device according to claim 1, wherein said first valve means includes a flapper disposed on said second enclosure opening.

6. A device according to claim 1, wherein said tube means includes first and second coaxial tubes, said first tube forming a seal with said first enclosure opening, said second tube disposed about the periphery of said first tube and defining a liquid flow space therebetween, said second tube having lower and upper openings respectively proximate the bottom and top ends of said enclosure for allowing liquid to enter the liquid flow space, said first and second tubes cooperating to allow liquid in said liquid flow space to enter said first tube proximate the top end of said enclosure, and an adjustable cap disposed on said second tube proximate said top end of said enclosure, the cap including holes spaced varying distances from said top end, said cap being adjustable to selectively align at least one of said holes in said cap with at least one of said upper openings of said second tube.

7. A device according to claim 1, further comprising varying means for selectively varying the amount of liquid flow into said second enclosure opening, said varying means being adjustable to prevent liquid from entering said second enclosure opening.

* * * * *

UNITED STATES PATENT AND TRADEMARK OFFICE

CERTIFICATE OF CORRECTION

PATENT NO. : 4,908,190

DATED : March 13, 1990

INVENTOR(S) : MURRILL W. MAGLIO ET AL

It is certified that error appears in the above-identified patent and that said Letters Patent is hereby corrected as shown below:

Claim 5, column 8, line 22, after "flapper" insert --valve--.

Signed and Sealed this

Thirtieth Day of April, 1991

*Attest:*

HARRY F. MANBECK, JR.

*Attesting Officer* *Commissioner of Patents and Trademarks*